United States Patent Office

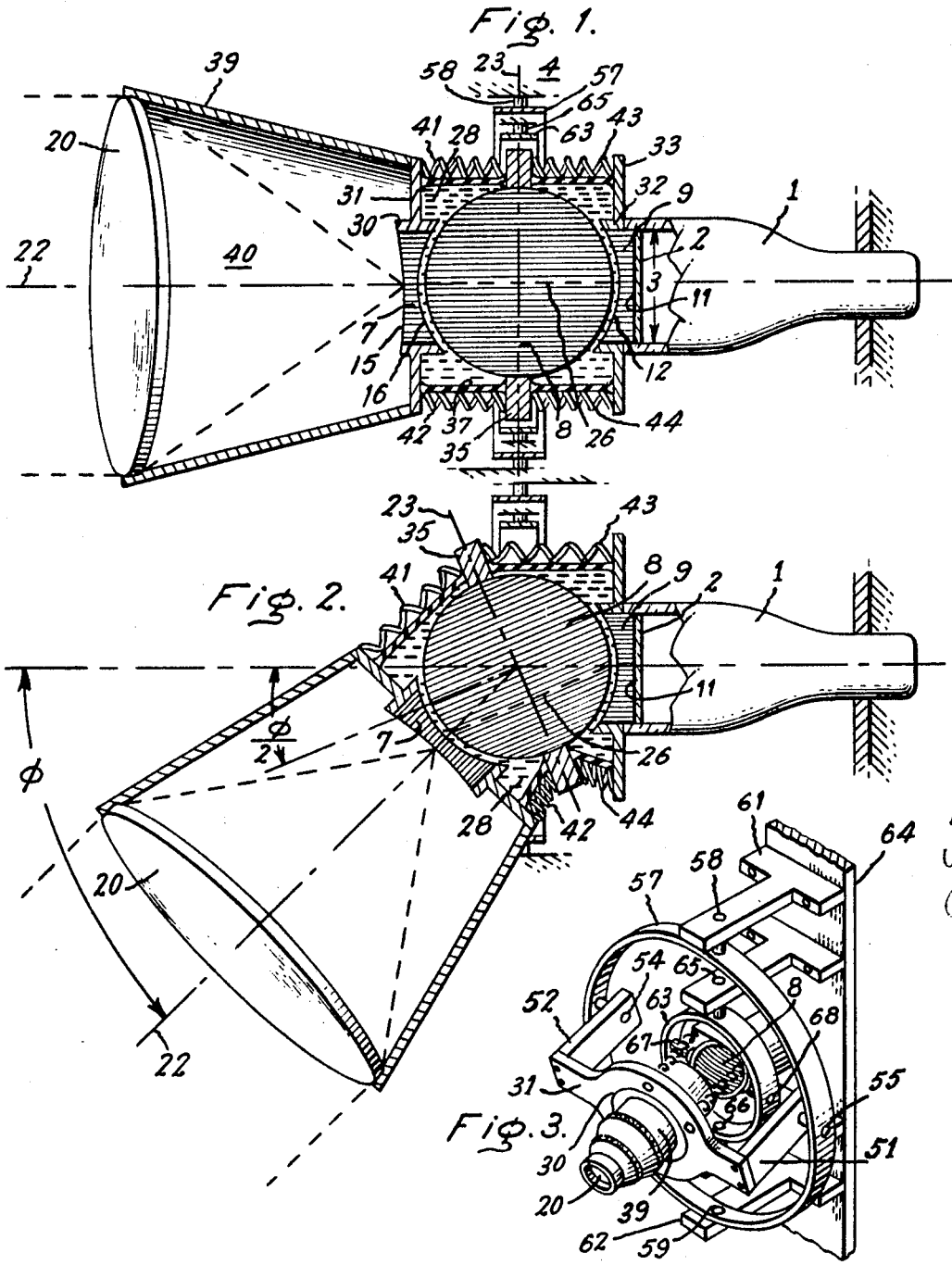

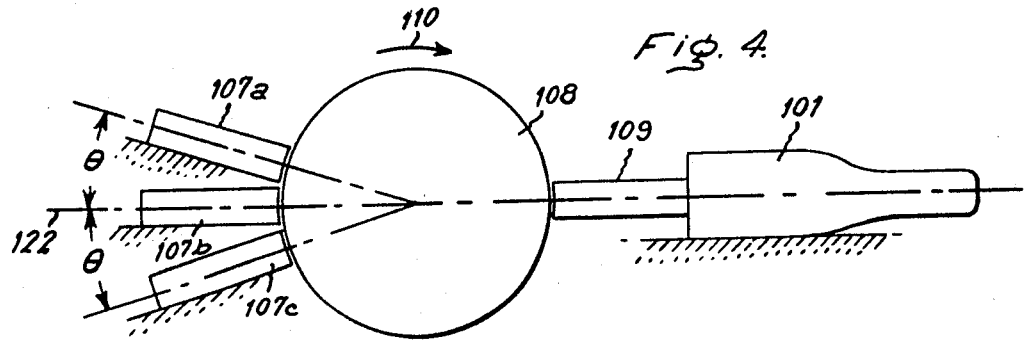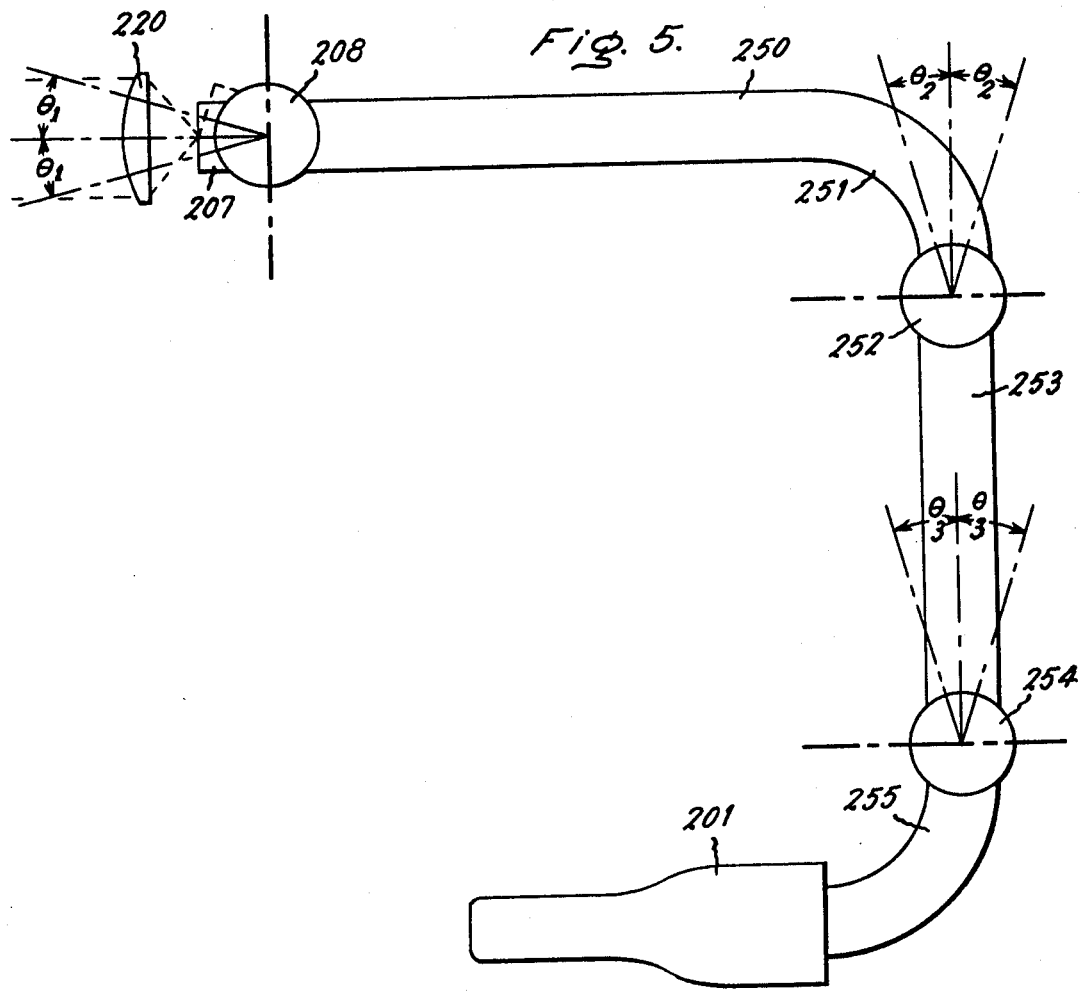

3,389,950
Patented June 25, 1968

3,389,950
FIBER OPTICS SCAN SYSTEM
Kennard W. Harper, Ithaca, N.Y., assignor to General Electric Company, a corporation of New York
Continuation of application Ser. No. 354,638, Mar. 25, 1964. This application Oct. 18, 1967, Ser. No. 677,001
6 Claims. (Cl. 350—96)

ABSTRACT OF THE DISCLOSURE

The subject invention relates to an improved optical scanning system, and more particularly, to a scanning system utilizing fiber optical elements. In a preferred form, the system comprises three fiber optics components: a central spherical element, a second element having a concave surface mating with the spherical element for focusing an image thereon, and the third fiber optic element also having a concave surface mating with said spherical element for deriving an image therefrom. A liquid may be provided between the mating surfaces which has a refractive index similar to that of the fiber optics. Additional means are provided for supporting the three fiber optic elements in position and for maintaining the central spherical member at half the angular displacement of the first optics element during scanning. Using a spherical central element, it is possible to conveniently provide for scanning about two orthogonal axes.

---

This is a continuation of application Ser. No. 354,638, filed Mar. 25, 1964, now abandoned.

It is frequently necessary for optical systems to scan through a considerable angle for detection and observation purposes. The scanning is usually accomplished by scanning or rotating the complete optical system or alternatively through use of an array of optical prisms which swing through the required angle. The principal problem encountered in swinging the complete optical system is the space required, particularly since the complete system often includes sensors such as infrared or television camera tubes. The use of rotating prisms also provides problems in that the rotation of a prism also rotates the image, which in turn requires a correction by a derotation prism and its associated assorted correcting lenses. The speed of the optics of the system also provides limitations on the selection of a scanning system. In a prism system the speed of the optical system is limited due to the large diameter lens system required back of the objective system to collect the edge rays. This means that the energy collecting capabilities of the prism system are limited to around $f/2$ to $f/3$. Typical applications for optical systems which operate, for example, in the infrared region normally require relatively fast optics of around $f/1.0$ while at the same time providing only a minimum of space available for the optics, precluding the rotation of the complete optical system which usually includes a camera tube or infrared vidicon.

It is an object of the subject invention to provide an improved wide angle scanning system requiring a minimum of space and moving parts while providing optimized energy collecting capabilities.

It is another object of the subject invention to provide an uncomplex scanning system in which portions of the system need only traverse a portion of the angle scanned.

It is yet another object of the subject invention to provide an uncomplex and compact scanning system suitable for relatively rapid scanning.

It is still another object of the subject invention to provide a wide angle scanning system which minimizes the number of components which need be moved to perform the scanning function.

It is a further object of the subject invention to provide an improved scanning system requiring only a relative small envelope yet including a relatively large optical entrance pupil.

Still further objects and advantages of the invention will become apparent as the following description proceeds and the features of novelty which characterize the invention will be pointed out with particularity in the claims annexed to and forming a part of this specification.

In accordance with one form of the invention, a fiber optics scan system is provided which utilizes fiber optic bundle members comprising a first rotatable fiber optics member having a substantially circular cross section with means for rotating the member about its axis of curvature. A second fiber optics member has a mating portion of circular cross section closely separated from the first member. Optical means are provided to focus an image on the first member of circular cross section in a direction generally along the length of its optical fibers. The optical fibers of the coherent fiber optics members extend substantially parallel to a fiber extending axially to the circular section.

More particularly, the optical means includes a third fiber optics member having a substantially circular cross section portion closely mating with a portion of the first fiber optics member different from that mating with the second member. A liquid is provided between the mating surfaces which has a refractive index similar to that of the fiber optics members. The first optical member is driven at a fraction (one-half) of the angular speed through which the optical means are rotated to perform a scanning function. The scanning angle viewed by the second fiber optics member through the first fiber optics member and the optical means is twice the angle through which the first fiber optics member is rotated.

For a better understanding of this invention, reference may be had to the accompanying drawings in which:

FIG. 1 is a diagrammatic showing of an optical system incorporating the invention, FIG. 2 is a diagrammatic showing of the system shown in FIG. 1 illustrating certain optical relationships involved as the system accomplishes a scanning function.

FIG. 3 is a perspective view of a simplified showing of the mounting arrangement of the elements shown in FIGS. 1 and 2.

FIG. 4 is an alternate embodiment of the invention utilizing a multiplicity of certain of the elements in order to provide an optical switching arrangement for scan purposes; and FIG. 5 is another embodiment of the invention utilizing the invention in an articulated arm optical system.

Referring to FIG. 1, there is shown an optical scan system in combination with a television camera pick-up tube 1 having a face plate 2 and a tube aperture illustrated by the arrow 3. Contiguous to the face plate 2 is a fiber optics lens system 4 comprising a fiber optics collector lens 7, a fiber optics cylinder or ball or sphere 8 and a fiber optics corrector lens 9.

Optical fibers are transparent fibers which transmit light along selected paths and as in the instant invention may be formed in coherent bundles to transmit complete images free from any of the restriction characteristics of conventional optical systems in a manner more fully described, for example, in "McGraw-Hill Encyclopedia of Science and Technology," McGraw-Hill Book Co., Inc., 1960, under the topic beginning at page 348 entitled "Optical Fibers" and the bibliography cited therein.

The fiber optics corrector lens 9 is generally cylindrical having a base or face 11 which may be planar to conform to the transparent face plate 2 of the camera pickup tube 1 and an axially opposed concave mating surface 12 having the same radius of curvature as the fiber optics sphere 8. Alternatively, the fiber optics corrector lens 9 can be provided as the face plate of the pick-up tube 1, thus providing a dual function.

The fiber optics collector lens 7 is of generally cylindrical shape having a surface 15 which can be shaped to the Petzval curve (focus plane) of the lens system which is used to focus the incoming image on surface 15. Axially opposed to surface 15 is a concaved mating surface 16 having the same radius of curvaturme as the sphere 8.

The fiber optics collector lens 7, ball 8 and corrector lens 9 are fabricated of fiber bundles of suitable material for the type of radiation involved. For use with visible light, 5–15 micron fibers aligned to form a coherent system and bonded or fuzed together by standard techniques may be used. It has been found that 10 micron fibers with a numerical aperture of 0.66 as manufactured and sold by Mosaics Fabrication of Southbridge, Mass., is suitable. The small fibers provide better reslution. For use with infrared radiation, a fiber optics material of in the 1.5 to 6 micron region can be obtained through use of $As_2S_3$ glass or other suitable material, drawn, clad, and put together in coherent bundles. The wavelength encountered in use is considered in determing the material to be used. After the bundles of optical fibers are bonded to the size required, the desired optical curves are ground and polished. The fiber optics correction lens 9 and collector lens 7 can, if desired, be shaped to magnify or minify as well as changing the viewing angle.

The clearance between the fiber optics ball 8 and the fiber optics collector lens 7 and corrector lens 9 is kept small to approximately 0.0005″ and the opposed surfaces are wetted by a lubricant having a refractive index the same as or similar to the index of the fiber optical material. It has been found that with the Mosaics Fabrication fiber optic material described above, a lubricant having a suitable viscosity and wetting power was found to be silicone XF–1060 sold by the General Electric Company, thinned one part to two parts of silicone XF–1050. This lubricant enables the space between the contiguous faces of the fiber optic material to be kept to a minimum to avoid image spread between adjacent fibers which can affect the resolution obtainable with the system. The incoming radiations are focused on the fiber optics collector lens 7 in the direction of the optical fibers thereof by the collecting optical system lens 20 which may, by way of example, be a 1 inch f/1.9 objective lens.

While the silicon lubricant described above has sufficient wetting power to provide lubrication without immersing the mating portions of the fiber optics lens system 4 in a lubricating reservoir, the system can be protected from dirt and other contaminants by surrounding the fiber optics lens system with a housing and filling the housing with the lubricant.

As shown in FIG. 1, the fiber optics collector lens 7 is supported by a support member 30 having a radially extending flange 31 while the fiber optics corrector lens 9 is similarly supported by a support member 32 which also has a readily extended flange 33 portion. The fiber optics ball 8 is supported for rotation by a gimbal ring 35 fastened circumferentially around a great circle thereof and pivoted for rotation by gimbal pins (not shown) which extend in a direction perpendicular to the intersection of the axis 22 and center line 23 that is perpendicular to the sheet of FIG. 1 at the center of the sphere 8. Rubber sleeve members 37 extend between the central regions of the flanges 31 and 33 of the support members 30 and 32, respectively, and may, if desired, be a single sleeve passing around the gimbal ring 35. Thus, a contatiner or reservoir is formed between the concave surfaces 12 and 16 of the fiber optics lens 9 and 7 respectively which surrounds the fiber optics ball 8 in the region where it mates with the fiber optics lens. This reservoir is filled with a silicone lubricant 28 or equal of the type described above.

The support member 30 of the fiber optics collector lens 7 is rigidly connected to the scanning collecting optical system lens 20 by a generally conically shaped metallic member 39 forming the scanning optics 40 which moves as a single member. A plurality of springs, such as 41 and 42, extend between the circumference of the flange 31 of the support member 32 and the gimbal ring 35 while a plurality of additional springs extend between the gimbal ring 35 and the circumference of flange 33 of the support member 32. The scanning optics 40 is mounted for rotation by a gimbal mounting described below in regard to FIG. 3 to enable rotation thereof independent of the rotation of the fiber optics ball 8. The axis of rotation of the scanning optics 40 lies along the same axis as that for gimbal ring 35.

As shown in FIG. 1, the various portions of the optical system are aligned along the axis 22 of the camera pick-up tube 1. It is noted that for the direct line of sight shown in FIG. 1 the individual optical fibers 24 of the fiber optics members 7, 8 and 9 which are diagrammatically shown by the parallel lines thereof lie parallel to the axis 22. A light ray passing through the center of the scanning optics 40 along axis 22 will pass through the sphere 8 along the fiber 26 lying along axis 22. FIG. 2 illustrates the scanning operation involved.

Referring to FIG. 2, it will be seen that the scanning optical system lens 20 and the fiber optics collector lens 7 have been rotated through an angle $\phi$ of 45°, the fiber optics sphere 8 has been rotated through an angle of $\phi/2$ of 22.5° from the axis of the camera pick-up tube 1 and the fiber optics corrector lens 9 and pick-up tube have remained stationary. The path of a light beam being received by the scanning optical system lens 20 is successively through the fiber optics collector lens 7, fiber 26 of ball 8, and fiber optics corrector lens 9 to the camera pick-up tube 1.

The two to one angular rotation ratio between the scanning optics 40 and the fiber optics sphere 8 may be accomplished as follows: The various springs 41, 42, 43 and 44 have the same force per inch of deflection and are of equal length such that a simple mechanism is provided for driving or rotating the fiber optics ball 8 at a half speed as compared with the collecting lens 20 and 7. The springs can be either of the tension or compression type. Moving the scanning optics 40 as shown in FIG. 2 compresses the springs 42 and 44 causing the ball 8 to turn or rotate in the direction of the compression. Since the opposing springs 41 and 43 provide a balance, the ball keeps its motion centered to ½ the angle of travel of the scanning optics 40. The sleeve members 37 when utilized with springs 41–44 are selected to be light and flexible so as to impart practically no force or motion on the ball.

It is possible with a lesser degree of accuracy to utilize the rubber sleeves not only as the sealing means but as the half speed proportional control if sleeves of proper resiliency are selected. However, in general the angle through which such an arrangement will operate will be less than that for springs and, furthermore, it is more difficult to balance or adjust the precise relative movement of the movable members. However, because of its lower cost, where precision of motion is not a prime requirement, rubber sleeves having a heavier wall and proper resiliency may be utilized in place of the springs.

It is possible to obtain a more direct control of the scanning operation with considerable accuracy by driving the ball 8 and scanning optics 40 by independent servo mechanism, servo mechanism drives, which for each axis of rotation of a gimbal mounted system and having the proper proportional speed driving relationship therebetween.

While FIGS. 1 and 2 illustrate the rotation or scanning in a single direction, the ball 8 and scanning optics 40 may be mounted in multiple gimbal mounting arrangements of the type utilized for gyroscopes to enable rotation in all directions to obtain a conical scan if desired. Additional pairs of springs would be utilized in that case and spaced circumferentially around the gimbal ring 35 of the ball 8. FIG. 3 illustrates in a somewhat diagrammatic form a simple gimbal mounting arrangement to enable scanning in a plurality of directions.

Referring to FIG. 3, it is seen that the optical lens 20, member 39, and the support member 30 which supports the fiber optics collector lens and which comprise the scanning optics 40 are rotatably mounted via mounting pieces 51 and 52 which connect between the radial flanges 31 of the support member 30 and the pivots 54 and 55 on gimbal 57. FIG. 3 shows the system in the position of FIG. 2 in that the scanning optics 40 is depressed about the pivots 54 and 55, the axis of which passes through the center of sphere 8. Gimbal 57 is in turn itself supported by a pair of diametrically opposed pivots or axes 58 and 59 which lie on an axis perpendicular to the axis of pivots 54 and 55 and also passes through the center of sphere 8. The pivots 58 and 59 of gimbal 57 are supported by support members 61 and 62, respectively, which in turn are mounted on base member 64. Thus, vertical scan of scanning optics 40 is provided about pivots 54 and 55 while horizontal scan is provided by the rotation of gimbal 57 about the pivots 58 and 59.

Similarly, the fiber optics sphere 8 is separately supported for rotation or scan in either the vertical or horizontal direction. Gimbal 63 is rotatively supported by a pair of pivots 65 and 66 which are stationary relative to base 64. This vertical axis through pivots 65 and 66 passes through the center of sphere 8 and enables rotation of the sphere which is supported thereby in a horizontal direction. The vertical rotation of sphere 8 is made possible through the rotation about the horizontal axis of the pivots 67 and 68 which connect between the gimbal 57 and the gimbal 35 connected to the sphere 8.

Thus, the scanning optics 40 and the sphere 8 are mounted for rotation both vertically and horizontally by their separate gimbal mounting arrangements which in combination enable a conical scanning operation.

It is possible for certain applications to omit the fiber optics collector lens 7 and focus the incoming rays directly through the scanning optical system lens 20 to the fiber optics ball 8. However, the resolution and versatility of such an arrangement would not be as good as that obtained through use of the fiber optics collector lens.

FIG. 4 illustrates an alternate embodiment of the scanning mechanism illustrated by FIGS. 1–3 in which instead of utilizing a movable fiber optics collector lens, a plurality of stationary radially extending fiber optics collector lenses or bundles may be selectively connected to a stationary output collector lens through the rotation of the fiber optics ball or cylinder.

Referring to FIG. 4, there is illustrated in simplified form a fiber optics optically switching light valve comprising a rotatably mounted fiber optics ball or cylinder 108, cooperating with a fiber optics collector lens 109, which in turn is optically connected to a camera pick-up tube 101 in a manner similar to that of the device illustrated by FIGS. 1–3. However, instead of utilizing a rotatable fiber optics collector lens such as 7 of FIG. 1, there are mounted a plurality of collector lenses or bundles 107a, 107b, and 107c spaced for example, with their axes 122, respectively, aligned with and 10 to 15 degrees on either side of the axis 122 of the camera pick-up tube 101. The lubricant reservoir, gimbal mounting arrangement, drive, and other details are not shown in the interests of brevity, but may be of the general type shown in FIGS. 1–3.

The optical system of FIG. 4 through the rotation of the fiber optics ball 108 in a clockwise direction as indicated by arrow 110 will selectively switch the image received by the camera tube 101 via the fiber optics collector lens 109 from that viewed by the collector lens 107b to that viewed by the collector lens 107a. The ball 108 will be rotated through an angle $\theta/2$ which is half the angle between the axis of the collector lens 107b and 107a. Similarly, rotation of the fiber optics ball 8 in a counter clockwise direction through an angle equal to $\theta'/2$ can selectively switch the output received through the collector lens 109 from that viewed by the collector lens 107b to that viewed by the lens 107c. Thus, there is provided an optical switching arrangement or light valve which enables the selective scanning or optical switching between preselected directions in the manner described in regard to FIGS. 1–3. If it is not necessary to transmit a coherent image but only perform an optical switching function, only the fiber optics ball 108 need be of coherent fibers.

It is sometimes desirable to provide a flexible line of sight in which a coherent image is to be transmitted over a distance where space is at a premium in various remote viewing devices. For example, it may be desirable to transmit coherent optical images over distances and around corners to cover a very wide angle of observation to enable a clear viewing of what is happening at the end of an articulate arm or manipulator.

FIG. 5 shows a fiber optics pipe system going around two elbows or corners which if gimbal mounted will provide two axes of freedom about each of these elbows. As in FIG. 4, the figure is in simplified form with the reservoir, mounting, drive, and other details omitted in the interests of brevity.

Referring to FIG. 5, there is shown a collecting optical system lens 220, a fiber optics collector lens 207 and a fiber optics ball 208 in combination quite similar to their counterparts of lens 20, lens 7 and ball 8 of FIG. 1. The output of fiber optics ball 208 is passed through a fiber optics pipe 250 which may include a right angle bend 251, passes through another fiber optic ball 252 through a linear portion of fiber optics pipe 253, then through a third fiber optics ball 254 to a right angle fiber optics pipe 255 to the camera pick-up tube 201. The angle of swing of each axis or rotation of the balls 208, 252 and 254 and shown by $\theta_1$, $\theta_2$, and $\theta_3$, respectively, which can be for example 45°. The ball in each case swings through an angle of $\theta/2$. This means that the lens can sweep through plus or minus 135° with no rotation of the image or change of focus.

Therefore, while particular embodiments of the subject invention have been shown and described herein, they are in the nature of description rather than illustration, and it will occur to those skilled in the art that various changes, modifications and combinations may be made within the provisions of the appended claims without departing from either the spirit or scope of this invention in its broader aspects.

What is claimed as new and desired to be secured by Letters Patent in the United States is:

1. A fiber optics scan system utilizing fiber optic bundle members comprising:

a first spherical fiber optics member, its fibers extending parallel to a central optical axis, means for supporting said first fiber optics member for universal rotation about its center, a second fiber optics member having its fibers extending parallel to a central optical axis and having a concave portion contiguous to and mating with a first portion of said spherical member with the optical axes thereof being mutually oriented for image transfer, optical means to focus a spherical image of an "instant" portion of a larger scanned field on the surface of said spherical member, means for supporting said optical means for universal rotation about said center with the optical axes of said optical means and said spherical member being mutually oriented for image transfer through the fibers of said spherical member, and means for coaxially rotating said spherical member and said optical means with said spherical member rotating at one-half the angular rate of said optical means to scan successive instant portions of said scanned field.

2. The arrangement set forth in claim 1 wherein a liquid lubricant is provided between the mating surfaces of said fiber optics members having a refractive index similar to that of said fiber optics members.

3. The arrangement set forth in claim 2 wherein said optical means includes a third fiber optics member having its fibers extending parallel to said central optical axis and having a concave portion contiguous to and mating with another portion of said spherical member, said liquid lubricant also lying between the mating surfaces of said members.

4. The arrangement set forth in claim 3 wherein a liquid reservoir is provided surrounding said spherical member for containing said lubricant.

5. The arrangement set forth in claim 3 wherein said coaxially rotating means comprises resilient members secured between said spherical and said second and third fiber optics members respectively.

6. The arrangement set forth in claim 3 wherein said coaxially rotating means comprises a plurality of springs secured between said spherical and said second and third fiber optics members respectively.

References Cited

UNITED STATES PATENTS

| | | |
|---|---|---|
| 2,093,288 | 9/1937 | Ogloblinsky. |
| 2,939,362 | 6/1960 | Cole. |
| 3,050,907 | 8/1962 | Hicks et al. |
| 3,221,591 | 12/1965 | Schepler. |

JOHN K. CORBIN, *Primary Examiner.*